H. C. LOCKWOOD.
Car-Wheels.

No. 133,461. Patented Nov. 26, 1872.

WITNESSES:
G. E. Upham.
D. D. Kane

INVENTOR.
Henry C. Lockwood,
Chipman Hosmer & Co.
Attys.

UNITED STATES PATENT OFFICE.

HENRY C. LOCKWOOD, OF BALTIMORE, MARYLAND.

IMPROVEMENT IN CAR-WHEELS.

Specification forming part of Letters Patent No. 133,461, dated November 26, 1872.

*To all whom it may concern:*

Be it known that I, HENRY C. LOCKWOOD, of Baltimore, in the county of Baltimore and State of Maryland, have invented a new and valuable Improvement in Car-Wheels; and I do hereby declare that the following is a full, clear, and exact description of the construction and operation of the same, reference being had to the annexed drawing making a part of this specification, and to the letters and figures of reference marked thereon.

Figure 1:
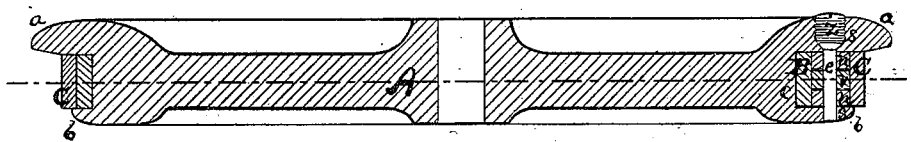
Figure 2:
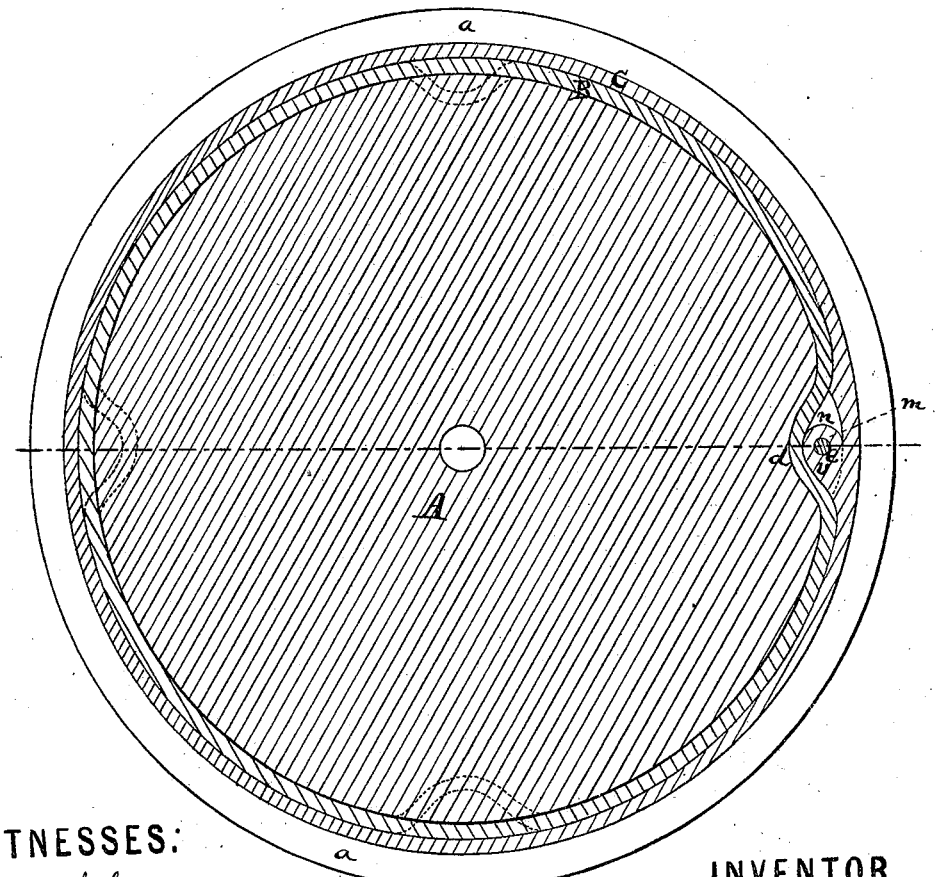

Figure 1 of the drawing is a representation of a horizontal section of my invention. Fig. 2 is a vertical longitudinal section of the same.

This invention has relation to the application of rubber to car-wheels to form a spring-cushion, which will tend to prevent jarring and obviate the excessive wear of parts; and it consists, first, in casting the body of the wheel with two peripheral flanches bounding a channel designed to hold the tire and its cushion, both of the latter being sprung into this channel over the outer or smaller flanch; and, second, in constructing the steel tire with a joint, by means of which its ends may be securely fastened together after it has been sprung over the said flanch into the peripheral channel of the wheel.

In the accompanying drawing, the letter A designates the body of the wheel, cast with a large inner flanch, $a$, as usual, and with an outer flanch, $b$. Between these flanches lies the channel $c$, designed to hold the rubber cushion and the tire. A depression in the bottom of the channel is formed at $d$, and is designed to admit the lugs of the tire-joint. B represents the rubber cushion, designed to be molded, usually, in the annular form required. This ring is designed to be sprung over the outer flanch of the wheel, and should lie closely to the bottom of the channel, filling the transverse space between the flanches, but not extending out to the edge of the smaller flanch. C represents the steel tire. This is a steel hoop, cleft at one point so that it may be opened to pass over the flanch $b$. At one end of the tire two internal lugs, $n$, are formed, and at the other end a single lug, $v$, adapted to fit between the lugs $n$. These lugs are transversely perforated for the passage of a pin, $e$, by which the tire is made secure after it has been sprung into position. The head of the pin may be hid by means of a short screw, $z$, or other device, secured to the flanch of the wheel. The pin is usually passed through perforations $s$ in the flanches, and, in connection with the lugs $n$ $v$ and recess $d$, serves to keep the tire from shifting. If not sufficient several lugs may be employed, as indicated by the dotted lines in the drawing. The joint $m$, which connects the ends of the tire, is a hinge-joint, and is designed to give all the necessary play which may be required at this point owing to the stiffness which may be due to the lugs.

This wheel is recommended by its simplicity and efficiency.

It is well known that it is not new to attach an outer flanch to the body of a wheel by rivets or other fastenings, and that many ways have been devised for cushioning the tread. Therefore I do not claim such inventions broadly; but—

What I claim as my invention, and desire to secure by Letters Patent, is—

1. The steel tire provided with a joint, $m$, and adapted to be opened at the ends forming said joint, substantially as and for the purpose specified.

2. The combination, with the two-flanched wheel-body A, of the steel tire jointed at $m$, substantially as specified.

3. The combination, with the two-flanched wheel-body A, of the rubber cushion or annulus B and the steel tire jointed at $m$, substantially as specified.

In testimony that I claim the above I have hereunto subscribed my name in the presence of two witnesses.

HENRY C. LOCKWOOD.

Witnesses:
D. D. KANE,
G. E. UPHAM.